(12) United States Patent
Blevins

(10) Patent No.: US 7,709,970 B2
(45) Date of Patent: May 4, 2010

(54) ELECTRICAL GENERATOR

(76) Inventor: Jerry Blevins, 109 Farm Hill Dr., Toms Brook, VA (US) 22660

( * ) Notice: Subject to any disclaimer, the term of this patent is extended or adjusted under 35 U.S.C. 154(b) by 312 days.

(21) Appl. No.: 11/889,792

(22) Filed: Aug. 16, 2007

(65) Prior Publication Data

US 2008/0042601 A1 Feb. 21, 2008

Related U.S. Application Data

(60) Provisional application No. 60/837,923, filed on Aug. 16, 2006.

(51) Int. Cl.
*H02P 9/04* (2006.01)
(52) U.S. Cl. .................................. 290/1 R; 290/1 C
(58) Field of Classification Search ............. 290/1 R, 290/1 A, 1 C, 4 C, 45
See application file for complete search history.

(56) References Cited

U.S. PATENT DOCUMENTS

| | | | | |
|---|---|---|---|---|
| 1,948,288 A * | 2/1934 | Corey | ............ | 74/41 |
| 3,921,741 A * | 11/1975 | Garfinkle et al. | ............ | 180/205 |
| 4,170,738 A * | 10/1979 | Smith | ............ | 290/42 |
| 4,321,837 A * | 3/1982 | Grigsby | ............ | 74/41 |
| 4,452,045 A * | 6/1984 | Matlin et al. | ............ | 60/641.8 |
| 4,480,966 A | 11/1984 | Smith | | |
| 5,808,368 A * | 9/1998 | Brown | ............ | 290/53 |
| 6,109,029 A * | 8/2000 | Vowles et al. | ............ | 60/398 |
| 7,009,350 B1 | 3/2006 | Gold | | |
| 7,315,092 B2 * | 1/2008 | Cook | ............ | 290/53 |
| 7,504,737 B2 * | 3/2009 | Vasilovich et al. | ............ | 290/1 R |

* cited by examiner

*Primary Examiner*—Nicholas Ponomarenko
(74) *Attorney, Agent, or Firm*—Hoffman, Wasson & Gitler

(57) ABSTRACT

An electrical generator utilizes power produced by falling weights. Falling weights are connected to long arms which turn a shaft. The shaft, through a series of gears, provides power to the generator.

9 Claims, 3 Drawing Sheets

ELECTRICAL GENERATOR

This application claims benefit of provisional application 60/837,923, filed Aug. 16, 2006.

BACKGROUND OF THE INVENTION

The generation and transmission of electrical power is a constant concern. Providing electrical power for the numerous needs of residential, commercial and industrial applications is a constant concern. These concerns include the noise and pollution associated with the generation of electricity and the problems in transmission over long distances.

SUMMARY OF THE INVENTION

An electrical generator utilizes power produced by falling weights. Falling weights are connected to long arms which turn a shaft. The shaft, through a series of gears, provides power to the generator.

DETAILED DESCRIPTION OF THE INVENTION

Figure 1:
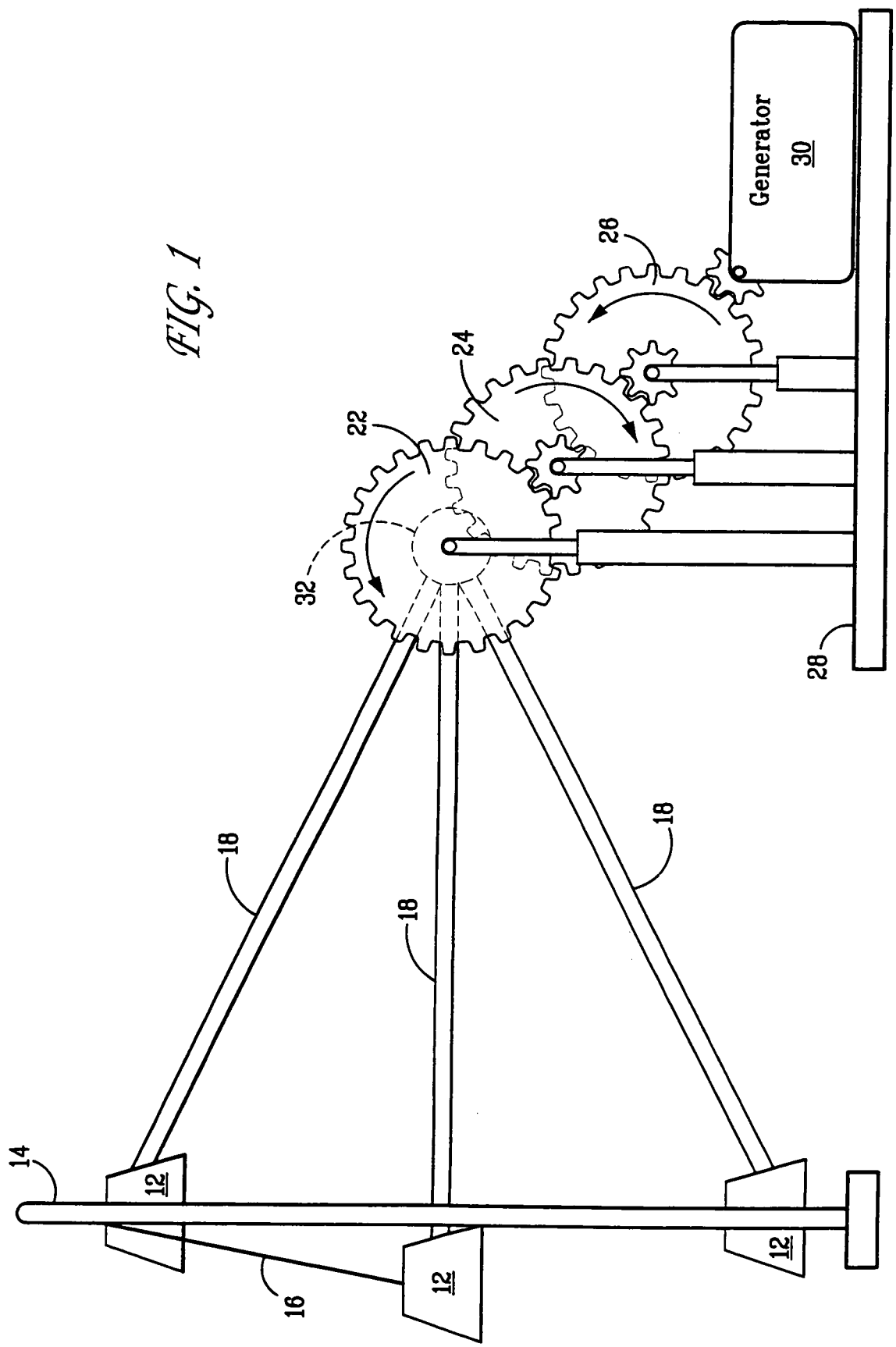
FIG. 1 is a side view of the electrical generator.

A series of weights 12 are connected to a rack 14. While three weights are shown, any number of weights may be utilized. An arm 18 extends from each weight, each connected to a shaft. The end of the arm moves in an arc while the weight moves in a line. To account for this difference, the arm attaches to the weight in any suitable manner. The end of the arm may attach to the weight by a cable or a rod pivotally connected to the weight, the arm, or both. Also, the arm may be made of telescoping sections, allowing the length of the arm to vary.

The shaft is connected to a first gear 22. The first gear 22 intermeshes with a second gear 24, a compound gear having a small gear turning with a larger gear. As the first gear 22 meshes with the smaller gear, an increase in rotational speed is gained. The larger of the second gear connects with the smaller gear of a third gear 26. The third gear set, likewise, is a compound gear having a small gear meshing with the larger of the second gear to again increase rotational speed. The larger gear meshes with an electric generator 30. Any number of gears may be used in the gears train between the shaft and generator in order to produce a desired rotational speed from the shaft.

Figure 2:
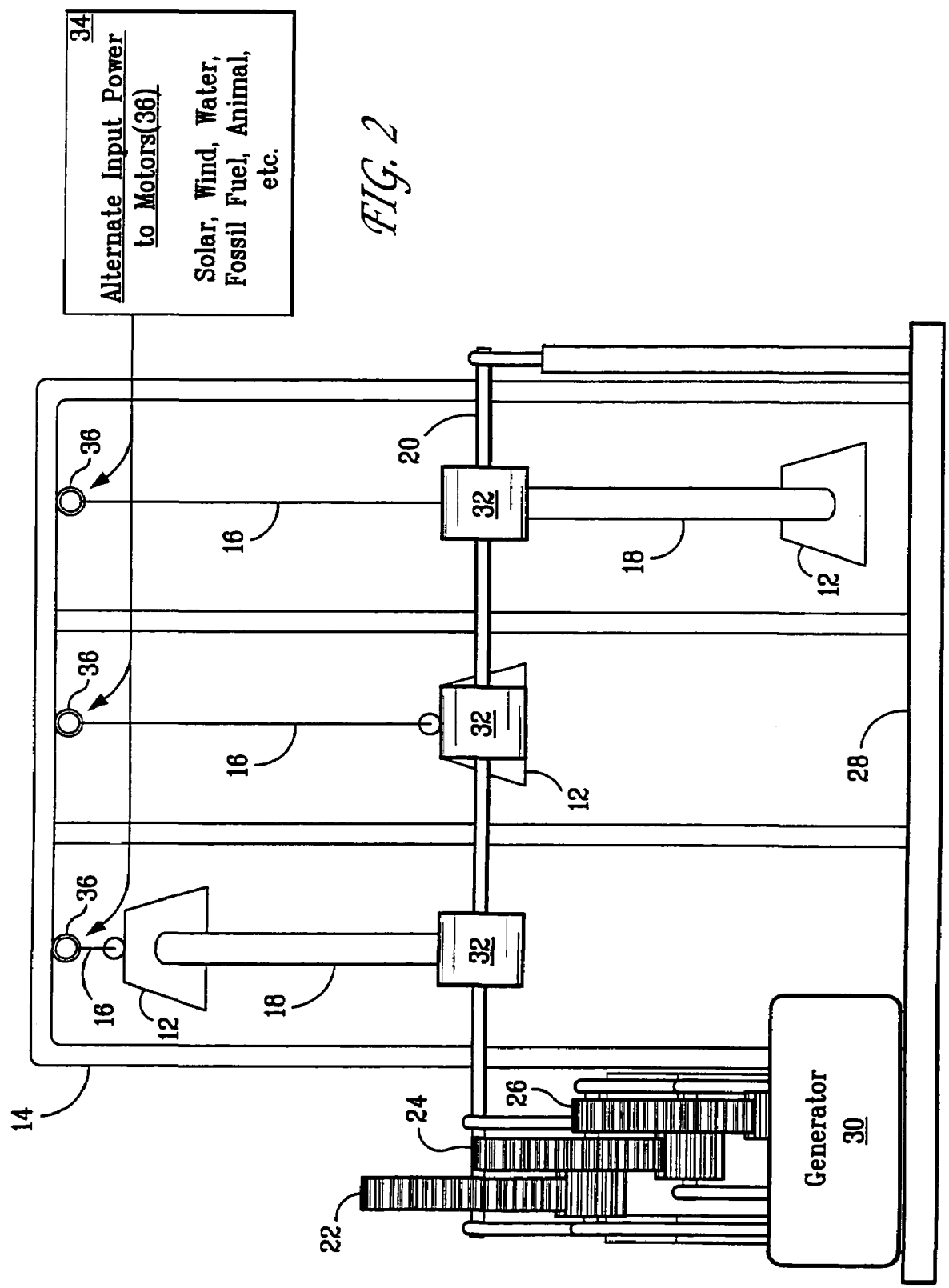
FIG. 2 is an end view of the electrical generator.

FIG. 2 shows the end view where the relationship between the weights is seen. The weights are suspended from the rack by a cable 16. After the weight 12 has reached its bottom most extent, it is raised back up by a secondary power source 36. In the view of FIG. 2, one weight is shown in its uppermost position, a second weight is shown in its lowermost position, and a third weight is shown in a middle position. In order that the arms turn the shaft 20 on its downward journey but still be able to be raised, each arm 18 is connected to the shaft 20 by a ratcheted spline 32. The ratcheted feature allows the arm to drive the shaft 20 yet still be raised without affecting movement of the shaft 20.

The weights may be in any position at any given time, including all weights in its uppermost position. The weights may be raised during off-peak electrical usage time, allowing for the later generation of electricity during peak usage to reduce the strain on the electrical system. Also, the secondary power source may be powered by a renewable power source 34, such as hydropower, allowing for the conversion of hydropower to electricity, or solar powered, allowing for the raising of weights during power production of the solar panels and generation of electricity when the solar panels are not producing. The weights may also be raised manually, if the weights are of a size making this feasible.

Figure 3:
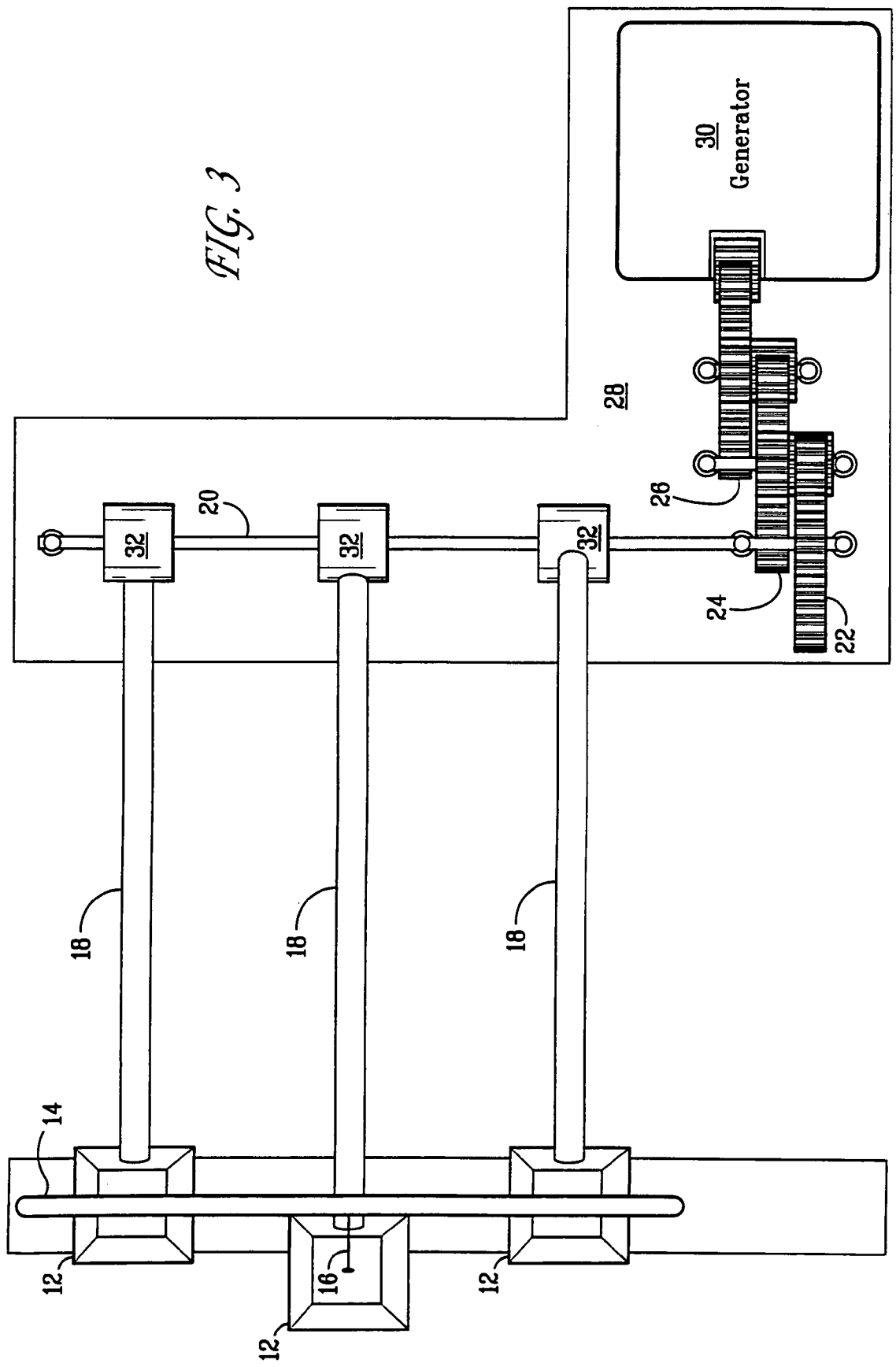
FIG. 3 is a top view of the electrical generator.

FIG. 3 depicts the platform 28 which supports the generator, gears and shaft 20. The distance between the platform 28 and rack 14 may be made any distance that is both desirable and feasible.

While the invention has been disclosed with reference to a preferred embodiment, variations and modifications would be apparent to one of ordinary skill in the art. Such variations and modifications are encompassed by the invention.

The invention claimed is:

1. A device for producing rotational motion connected to an electrical generator, comprising:
   a rack;
   a plurality of vertically movable weights;
   a plurality of secondary power sources connected to said rack
   a plurality of cables, each of said cables provided between one of said secondary power sources and one of said weights;
   an additional power source connected to each of said secondary power sources used to raise each of said plurality of weights when they reach a bottom most position;
   a plurality of arms, each of said arms having a first and second end, with each of said first ends connected to one of said plurality of weights; and
   an elongated shaft connected to each of said second ends of said plurality of arms, said shaft rotated by the movement of said plurality of arms;
   wherein the rotation of said shaft is transmitted to the electrical generator to produce electrical energy.

2. The device of claim 1, further comprising a gear train connected to a shaft of the electric generator.

3. The device of claim 2, wherein said gear train comprises a first gear attached to said elongated shaft,
   a second gear meshing with said first gear, and
   a third gear meshing with said second gear and a fourth gear connected to the shaft of the electric generator.

4. The device of claim 3, wherein said second and third gears are compound gears.

5. The device of claim 1, wherein the said plurality of weights comprises three weights, each weight connected to said elongated shaft through one of said plurality of gears.

6. The device of claim 5, further including a ratchet spline between each of said arms and said elongated shaft.

7. The device according to claim 1, wherein said additional power source is renewable.

8. The device in accordance with claim 7, wherein said additional power source is hydro power.

9. The device in accordance with claim 7, wherein said additional power source is solar power.

* * * * *